May 3, 1927.
E. A. HAMMETT
1,626,817
ELECTRICALLY OPERATED VALVE MECHANISM
Filed April 21, 1924
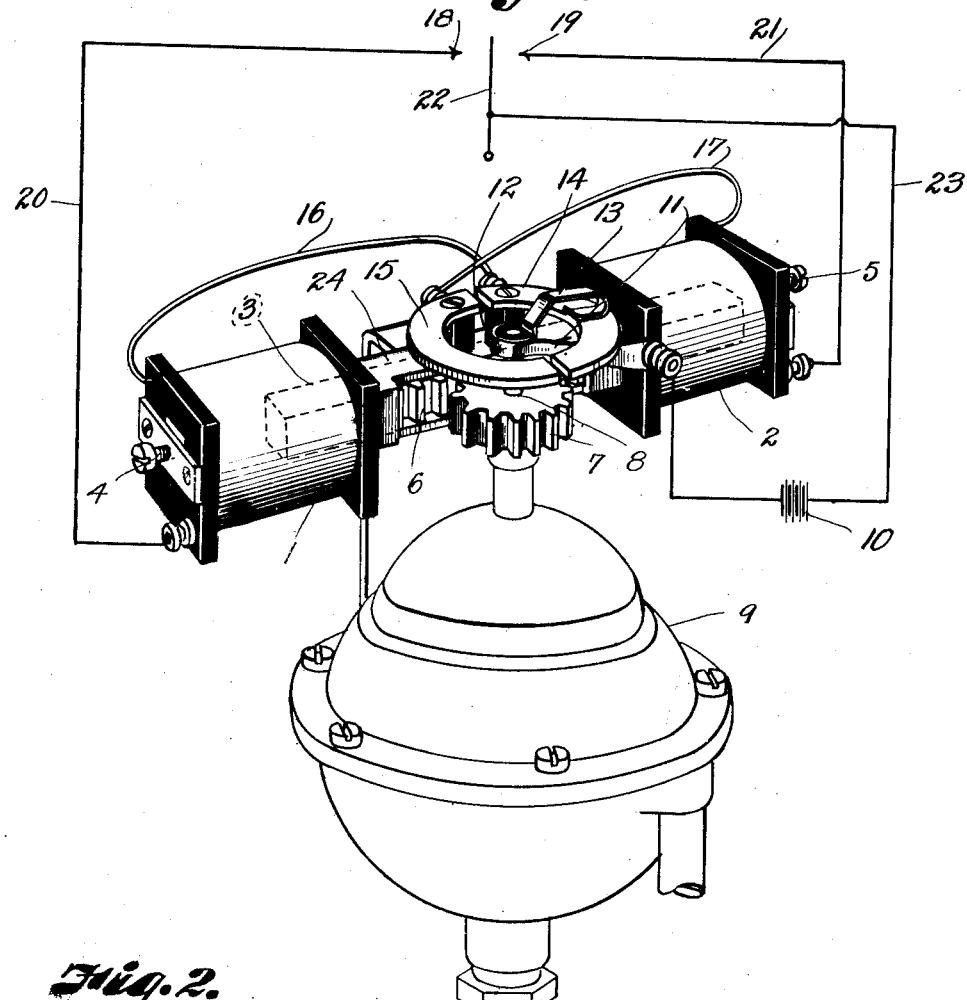
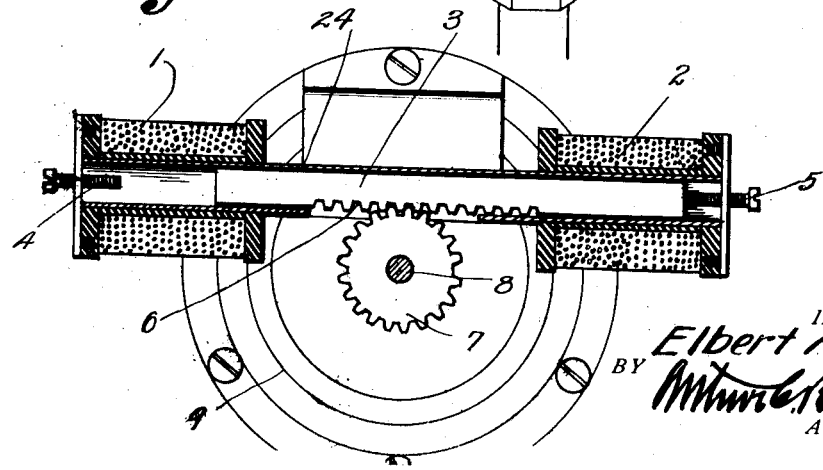
INVENTOR
Elbert A. Hammett
BY
ATTORNEY Patented May 3, 1927.

1,626,817

UNITED STATES PATENT OFFICE.

ELBERT A. HAMMETT, OF KANSAS CITY, MISSOURI.

ELECTRICALLY-OPERATED VALVE MECHANISM.

Application filed April 21, 1924. Serial No. 707,926.

This invention relates to an electric motor particularly applicable for operating valves and the like although it is not necessarily limited to that particular use.

The invention in its more specific aspect contemplates the provision of means for automatically varying the effective port opening of a valve in response to variations in heat and to this end a thermostat control is provided for the electric motor which may be operated from any suitable source of power as, for example, a secondary battery.

In order to maintain a constant heat in an oil furnace, it is desirable that some sort of a regulator be provided and this regulator must be sensitive enough to operate in response to heat variations and be rugged enough to stand the wear and tear to which such a device must necessarily be subjected.

To this end I have provided an electric motor including solenoids with a solenoid core adapted to be alternately energized in response to a thermostat element indicated as a wire switch so that either of two solenoids may be energized; one when the temperature rises and the other when the temperature falls. Means is also provided for shutting off the current supply as soon as either solenoid has energized its core or armature to function in the right direction.

I have also provided means for stabilizing or holding the core against rebound.

All of these features will be clearly understood by reference to the following description in connection with the accompanying drawings, in which Fig. 1 is a perspective view of a device constructed in accordance with my invention, and Fig. 2 is a sectional view through the same.

The motor is illustrated as consisting of two solenoid windings 1 and 2 to alternately impart longitudinal movement to a solenoid core or armature 3 which extends into each solenoid winding. In the ends of the solenoids are adjustable stop screws 4 and 5 which become magnetic by induction when the windings are energized and tend to hold the solenoid core 3 against rebound.

The solenoid core or armature 3 is provided with a rack toothed portion 6, adapted to mesh with a pinion 7 on a stem or shaft 8 so that a valve on the end of the stem or shaft 8 may be turned to either open or closed position, dependent upon the direction of rotation of the pinion 7.

The valve casing 9 is merely illustrative of a known type of valve but it is no wise intended that the invention shall be limited to use with the particular type of valve shown.

Current for the solenoid coils or windings may be furnished by any suitable means as, for example, a secondary battery 10, one terminal of which is connected to a brush 11, suitably mounted and bearing against a hub 12 of a switch arm 13, the hub being fastened to the end of the stem or shaft 8 and the switch arm being adapted to ride over and bear against the spaced insulated segmental contacts 14 and 15 connected to the solenoid windings 1 and 2 through the medium of the conductors or wires 16 and 17 respectively. The solenoid windings are also connected to switch points 18 and 19 through the wires 20 and 21, the switch points being spaced apart and being adapted to contact with a thermostatic switch indicated as a hot wire 22, connected to one side of the secondary battery 10 through the conductor 23.

If the temperature adjacent to the switch arm 22 is such that the switch arm will bear over to the left to contact with 18, then a complete circuit will be established between the battery 10, brush 11, hub 12, arm 13, segment 14, wire 16, coil 1, wire 20, arm 22 and wire 23, causing the armature 3 to be pulled to the left to operate the pinion when the armature strikes the screw stop 4, the stop 4, having been magnetized, will tend to hold the armature against rebound. As the pinion rotates in a counter-clockwise direction, the arm 13 will swing over to the segment 15, off 14 so that the circuit will immediately be broken and the thermostat arm 22 may bear against 18 without causing any current flow. Therefore, the time that the magnetic coil 1 is energized will be just long enough to pull the armature 3 to the left. The valve on the end of 8 will remain in the position thus set until the switch arm 22 moves over to 19, then the circuit will be closed through battery 10, brush 11, hub 12, arm 13, segment 15, wire 17, coil 2, wire 21, arm 22, wire 23 and back to battery 10, so as to pull the armature from left to right, rotating the pinion 7 in a clockwise direction. In doing this the arm 13 will be moved off of the live segment 15 onto the dead contact 14 so the circuit will again be broken and it is an important feature of my invention that with the arrangement shown only enough current will flow through the solenoid winding to actuate the solenoid core, and in this respect the mechanism shown is much more economical than those mechanisms in which either one or the other of two solenoids is constantly energized.

The solenoid core is preferably guided in the tube 24 which carries the solenoid windings 1 and 2.

It will be apparent that the device is susceptible of multitudinous uses and while I have specifically defined it for use in connection with valves, I do not wish to be limited beyond the scope of the appended claims.

What I claim and desire to secure by Letters-Patent is:

The combination with a thermostatically controlled switch of a pair of solenoid windings having aligning openings therein, a guide member connecting said windings having an opening aligning with the openings in said windings, and having a second opening in one of its sides, a solenoid core slidable longitudinally in the guide member and into the openings in said solenoid windings, gear teeth on the core member, a shaft extending at right angles to the core member, a pinion fixed on said shaft and engaging the teeth on said core member, and a switch arm secured to the end of said shaft for alternately breaking the circuit to the respective energized solenoid windings.

In testimony whereof I affix my signature.

ELBERT A. HAMMETT.